July 17, 1934.    R. C. ZASTROW    1,966,660
VACUUM CONTROL BRAKE DEVICE
Filed Dec. 12, 1931
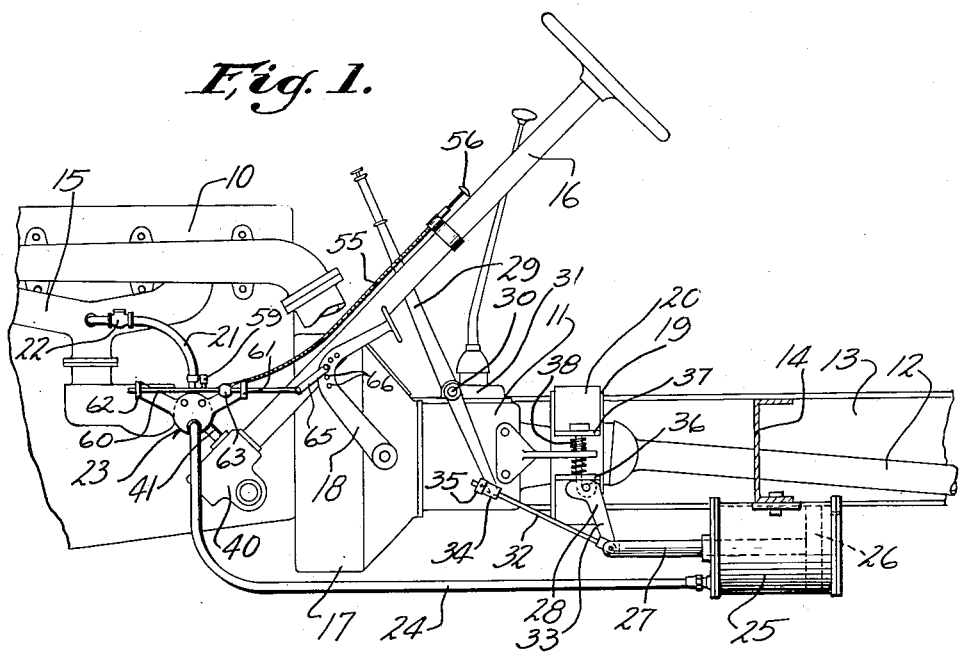
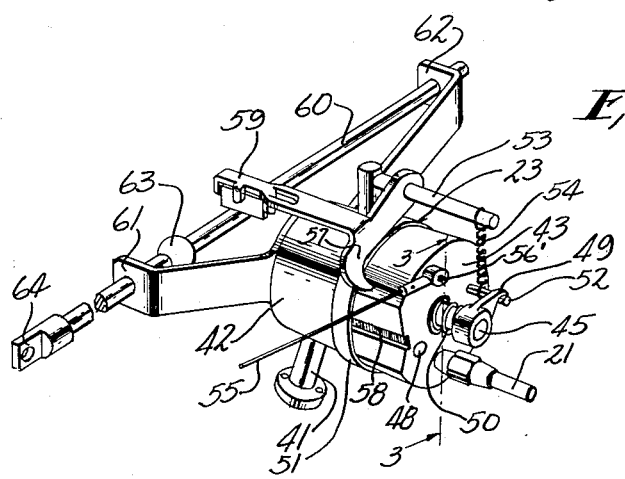
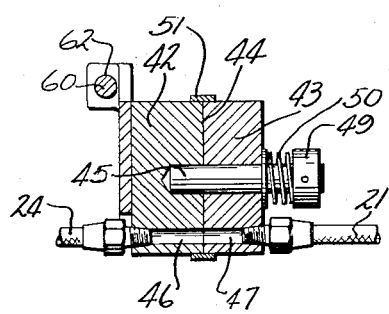
INVENTOR
Robert C. Zastrow
BY
Wheeler Wheeler & Wheeler
ATTORNEYS.

Patented July 17, 1934

1,966,660

UNITED STATES PATENT OFFICE 1,966,660

VACUUM CONTROL BRAKE DEVICE

Robert C. Zastrow, Racine, Wis.

Application December 12, 1931, Serial No. 580,595

4 Claims. (Cl. 192—13)

My invention relates to improvements in vacuum control brake devices.

The object of my invention is to provide an automatically operated brake actuator for automotive vehicles so connected with the usual control devices of such a vehicle as to assist the operator in controlling it under adverse starting conditions.

More particularly stated, it is the object of my invention to provide an automatic brake actuator interlocked with the clutch of an automobile, whereby to apply the brake and to release it only when the clutch is about to be engaged.

In the drawing:

Figure 1 is a side elevation of certain parts of an automotive vehicle equipped with my invention.

Figure 2 is an isometric view of the valve mechanism which I use for the control of my automatic brake.

Figure 3 is a section on line 3—3 of Figure 2.

Like parts are identified by the same reference characters throughout the several views.

In Figure 1 I show my invention incorporated in an automotive vehicle including the usual conventional type of internal combustion engine 10, a gear transmission 11, and torque tube 12. A portion of the frame 13 of the vehicle is shown in part at 13, and a cross member 14 of the frame is shown in section.

In order to qualify certain phases of the operation of my device, attention is called to the intake manifold 15, steering column 16, clutch casing 17 and clutch lever 18, and a brake drum 19 comprising a part of a brake upon a drive shaft housed within the torque tube 12.

Fundamentally, the application of brake band 20 upon brake drum 19, or the application of a braking force by means of a similar braking mechanism at the proper time and in co-ordination with the movement of the proper control devices, such as clutch lever 18, comprises the essence of my invention.

In the particular vehicle, a portion of which is shown in Figure 1, the application of brake band 20 upon brake drum 19 is accomplished by means of a vacuum actuated mechanism wherein the vacuum in intake manifold 15 on the motor 10 is resorted to by means of a pipe 21 with check valve 22 connected to my improved valve 23 which establishes connection at the proper time through pipe 24 to a vacuum cylinder 25 provided with a piston 26, piston rod 27, and a brake band actuating cam 28. This brake band actuating cam 28 is one provided in a conventional brake actuating system known as an "emergency brake", including a handlever 29 pivoted at 30 upon a boss 31 comprising part of the casing of gear shift 11, the lever at 29 being secured at its lowermost extremity to a link 32 which connects it with arm 33 of the cam 28. At 34 I provide a loose connection in the form of a block through which link 32 is freely reciprocable under the limitation of a link head 35.

When my valve 23 is so disposed as to permit the vacuum in the manifold 15 to act upon piston 26 and piston rod 27, link 32 slides freely in the block 34, and the cam arm 33 is thrust forwardly so as to apply the cam 28 to a cam shoe 36 at one end of the brake band 20, and likewise to act upon a hook secured to the other end 37 of brake band 20 and apply a clamping pressure upon drum 19. When the vacuum in the connections 21 and 24 is released by means of my valve 23, spring 38 returns the piston 26 to the position shown in Figure 1, so that the pressure upon brake band 20 is released.

Attention is now directed to my special valve control for the piston 26, the valve being shown probably most clearly in Figures 2 and 3; its connections to the operating levers of the car being shown in Figure 1. My valve may be mounted in any position in the mechanism of an automotive vehicle where operative connections may be provided to interlock the valve with the clutch lever 18, but I have found that it is best installed upon the gear case 40 at the base of the steering column 16, and I use a standard 41 as a means of attaching the valve 23 to the gear case 40.

The valve itself comprises a base member 42 and a rotor 43, the contacting faces of which are ground to a plane surface to create a vacuum-tight seal at 44.

The base member 42 is provided with a port 46 radially somewhat distant from center pin 45. This port is directly connected through pipe 24 to the cylinder 25. Rotor 43 is provided with ports 47 and 48, port 47 being directly connected to pipe 21 and through check valve 22 to the manifold 15.

Port 48 is a relief port radially equidistant from center pin 45 with port 47, and since rotor 43 revolves about center pin 45 ports 47 and 48 may alternatively be positioned in registry with port 46 through the base plate.

On the end of center pin 45 is a stop arm 49, the hub of which about the shaft 45 acts as a retainer for a spring 50 which maintains the rotor in seal contact at 44 with the base plate 42. A collar 51 secured to the base plate provides a flange in protective relation to the joint between the rotor and the base plate. At 52 I provide a stop pin extending outwardly from the rotor 43 in a position to contact with the stop arm 49. When the stop pin 52 is in contact with the stop arm 49 the relief port 48 is in registry with port 46, and the pressure in pipe 24 returns to atmospheric. Spring arm 53 and tension spring 54 tend to rotate the rotor 43 to relief position.

At 55 I provide a Bowden wire control extending from a conveniently located button 56 to an operating pin 56' on the rotor so that the operator of a vehicle equipped with my invention may, by thrusting the button and Bowden wire downwardly, rotate the rotor 43 in opposition to the tension spring 54 until a pawl 57, pivotally mounted upon spring arm 53, drops by gravity into detent 58, thus preventing the spring 54 from returning the rotor to a position in which stop pin 52 is in contact with stop arm 49. With the rotor in the position where the pawl 57 is in detent 58, port 46 is in registry with port 47 as shown clearly in Figure 2, thus establishing a direct connection between the manifold 15 and the cylinder 25 to establish a reduced pressure in the cylinder and actuate the piston 26.

Extending laterally from the pawl 57 I provide a cam follower releasing device 59 for the pawl 57, and a cam rod 60 mounted for reciprocation in extended wing brackets 61 and 62 is provided with a cam 63 to pass under or against the cam follower 59. Cam rod 60 is provided with a link connection at 64 with a link 65 which in turn is connected in any one of a series of points of attachment 66 on the clutch lever 18.

An automobile equipped in accordance with my invention will, when operated with the Bowden wire control in the position shown in the drawing, be driven in the usual manner since the pawl 57 will ride up on the rotor 43 and the cam follower 59 will be elevated above cam 63 upon cam rod 60. Port 48 will be in registry with port 46 and atmospheric pressure will prevail in the cylinder 25 so as to maintain the brake band 20 in brake release position. Reciprocation of the cam rod 60 in normal operation of the clutch lever 18 will be ineffective and the emergency brake will be operative in manual control thereof by reason of the contact of block 34 against link head 35. As the automobile equipped in accordance with my invention approaches a traffic situation which calls for a stop upon an incline, where the car may drift backwardly during the starting operation, the operator may thrust the Bowden wire control downwardly by pressure upon button 56, thus causing the rotor 43 to rotate upon center pin 45 until pawl 57 drops into detent 58 and port 47 is in registry with port 46 to connect the low pressure of the manifold 15 with the cylinder 25 and cause air pressure to force the piston 26 forwardly, and by reason of its connection through the piston rod 27 and cam arm 33, the brake 19—20 will be applied.

During this movement of the piston 26 the link 32 will slide through block 34 and the emergency brake lever 29 will remain stationary.

Regardless, therefore, of the use of the service brake or failure by the operator to use the service brake the automobile equipped with my improved device will remain stationary by reason of the automatic setting of the emergency brake until the operator is prepared to advance the car by releasing the clutch lever 18. Proper adjustment of the link 65 in coordination with the clutch lever 18 so disposes the cam 63 with respect to the cam follower 59 that at the critical point in the movement of clutch lever 18, at the instant of clutch engagement, cam 63 raises the cam follower 59, disengages the pawl 57 from detent 58, and the spring 54 instantly returns rotor 43 to vacuum relief position of port 48 in registry with port 46, and the rush of air into cylinder 25 through pipe 24 will accomplish the release of the emergency brake 19—20 so that the car may advance as the clutch takes hold.

It will be apparent from the above description that a mere pressure downwardly upon button 56 at any intersection where slopes in the roadway will cause difficulty in starting the car, will establish a cycle of mechanical and fluid brake control movements, removing the burden of rapid or accurately coordinated manual or foot movements from the operator of an automobile.

I claim:

1. In an automotive vehicle provided with a brake and an internal combustion engine provided with an intake manifold, the combination with a fluid operated brake setting mechanism, of a valve, and pipe connections for controlling fluid pressure in the brake setting mechanism, said valve being normally positioned for brake release; manually adjustable means for setting the valve for brake setting operations through the establishment of a vacuum line between the manifold and the brake setting mechanism; a clutch lever; and connections between the clutch lever and the valve to disengage the manual control means and permit the valve to return to brake release position.

2. The combination with an automotive vehicle provided with a brake, a brake lever and a separate brake actuator and a clutch, of a valve for controlling the brake actuator interlocked with the clutch to automatically release the brake actuator in the movement of the clutch to engaged position, and a manual control for the valve, whereby to make the actuator operative.

3. In an automotive vehicle provided with driving connections, a brake and clutch therefor, the combination with a separate automatic brake setting mechanism manually adjustable to brake set position, of a clutch operating lever interconnected with the automatic brake setting mechanism, whereby to release the brake in the movement of the clutch lever to clutch engaged position.

4. In a vehicle provided with a clutch and a brake, the combination with a fluid-controlled vacuum brake applying device, of a valve in a vacuum line connected to said device, said valve comprising a ported base plate and a ported rotor, means constantly urging the rotor to brake releasing position, manual control means for urging the rotor to brake applying position, automatic means for maintaining the rotor in brake set position, a cam rod for disengaging said automatic means, and linkage between the cam rod and the clutch lever, whereby to disengage the brake in the movement of the clutch lever to clutch engaged position.

ROBERT C. ZASTROW.